(12) United States Patent
Yoshida

(10) Patent No.: US 6,728,805 B2
(45) Date of Patent: Apr. 27, 2004

(54) NOISE REDUCING METHOD FOR RADIO PORTABLE TERMINAL

(75) Inventor: Kenichi Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/280,025

(22) Filed: Oct. 25, 2002

(65) Prior Publication Data

US 2003/0051082 A1 Mar. 13, 2003

Related U.S. Application Data

(62) Division of application No. 09/426,942, filed on Oct. 26, 1999.

(30) Foreign Application Priority Data

Oct. 27, 1998 (JP) ............................................. 10-305837

(51) Int. Cl.$^7$ .............................................. G06F 13/14
(52) U.S. Cl. ........................ 710/62; 710/263; 365/227
(58) Field of Search .................... 710/62, 263; 365/227

(56) References Cited

U.S. PATENT DOCUMENTS 3,905,025 A * 9/1975 Davis et al. ............. 340/172.5
5,163,152 A * 11/1992 Okamoto .................... 395/725
5,659,759 A * 8/1997 Yamada ..................... 395/738

FOREIGN PATENT DOCUMENTS

| JP | 5-197670 A | 8/1993 |
| JP | 7-203510 A | 8/1995 |
| JP | 8-70258 A | 3/1996 |
| JP | 2748773 B2 | 2/1998 |
| JP | 10-103148 A | 4/1998 |

* cited by examiner

*Primary Examiner*—Abdelmoniem Elamin
(74) *Attorney, Agent, or Firm*—Foley & Lardner

(57) ABSTRACT

A noise reducing method for a radio portable terminal having a radio section for transmitting and receiving radio data, a CPU (Central Processing Unit), connected to the radio section and incorporating a cache, for performing predetermined data processing, and an external memory connected to the CPU, reads an internal operation program runnable only in the CPU from the external memory and stores the internal operation program in the cache prior to reception of the radio data, and then executes only the internal operation program. In this manner, this method suppresses access to the external memory, thereby reducing noise.

4 Claims, 7 Drawing Sheets

: TRANSMIT AFTER RECEPTION PROCESS

: LOCK CACHE TO PREVENT REWRITING OF CONTENTS OF CACHE. OR STORE TRANSMISSION PROGRAM IN NON-CACHE AREA

: LOAD TRANSMISSION PROGRAM FROM EXTERNAL MEMORY

: ACCESS TO EXTERNAL MEMORY BECAUSE THERE IS NOT MUCH INFLUENCE OF NOISE IN TRANSMISSION MODE

: NO MASK BECAUSE THERE IS NOT MUCH INFLUENCE OF NOISE IN TRANSMISSION MODE

: TRANSMIT AFTER RECEPTION PROCESS

: LOAD TRANSMISSION PROGRAM FROM EXTERNAL MEMORY

: ACCESS TO EXTERNAL MEMORY BECAUSE THERE IS NOT MUCH INFLUENCE OF NOISE IN TRANSMISSION MODE

: NO MASK BECAUSE THERE IS NOT MUCH INFLUENCE OF NOISE IN TRANSMISSION MODE

NOISE REDUCING METHOD FOR RADIO PORTABLE TERMINAL

CROSS-REFERENCE TO RELATED PATENT APPLICATIONS

This application is a division of Application Ser. No. 09/426,942, filed Oct. 26, 1999, now pending, and based on Japanese Patent Application No. 10-305837, filed Oct. 27, 1998, by Kenichi Yoshida. This application claims only subject matter disclosed in the parent application and therefore presents no new matter.

BACKGROUND OF THE INVENTION

1. Field of the Invention

The present invention relates to a noise reducing method for a radio portable terminal, and, more particularly, to a noise reducing method for reducing noise generated by a central processing unit (CPU) in a radio portable terminal.

2. Description of the Related Art

Conventional measures against noise in a radio portable terminal include a scheme of stopping the operation of the CPU in the radio portable terminal at the time of receiving data and a scheme of shielding the CPU, an external memory, and so forth. Recently, there has been a demand for an improvement of the processing performance of radio portable terminals, which has led to an increasing use of fast CPUs in the radio portable terminals. Thus, it is not a good idea to stop the operation of the CPU in tile radio portable terminal at the time of receiving data.

When the CPU in a radio portable terminal accesses an external memory, large noise is generated. To suppress noise by reducing the number of accesses to the external memory, the conventional radio portable terminals use an exclusive read only memory (ROM) or random access memory (RAM) incorporated in the CPU.

For example, Japanese Patent No. 2748773 (hereinafter called "first prior art")

discloses a method of reducing noise generated by the operation of a CPU used in a radio receiving circuit, thereby improving the sensitivity of the radio receiving circuit.

FIG. 7 presents a structural diagram of a conventional radio portable terminal which is disclosed in the first prior art. The radio portable terminal shown in FIG. 7 comprises a microprocessor 300 which operates in a dual mode, an interface 205, a user interface 117, a mode switch 308, a RAM 202 and a ROM 201.

This dual-mode microprocessor 300 has a RAM 301 and ROM 302 as its internal memories. The ROM 302 may be a masked ROM or an erasable programmable ROM (EPROM). This dual-mode microprocessor 300 may further include an electrically erasable programmable ROM (EEPROM) 303 which can be used for permanent storage of a program or data.

The mode switch 308 is connected to first-mode and second-mode select terminals (not shown) via a plurality of conductors 309. The user interface 117 is connected via a control input conductor 307 to the microprocessor 300 to provide the microprocessor 300 with predetermined information. Specifically, the control input conductor 307 provides means for starting the mode change (between the first mode and the second mode) in the dual-mode microprocessor 300. The user interface 117 is connected to the microprocessor 300 by a plurality of data input lines 305 and a plurality of data output lines 306.

It is understood from experiments that the level of noise generated in the dual-mode microprocessor 300 can be reduced considerably when the microprocessor 300 operates only in internal mode (the aforementioned first mode) where the individual internal memories 301, 302 and 303 are mainly used, as compared with a case where the microprocessor 300 operates in external mode (the second mode) in which an external memory is used. In the first prior art, therefore, the dual-mode microprocessor 300 operates while being switched to a single-chip mode, i.e., the internal mode, or an extension mode, i.e., the external mode. Specifically, the basic operation is carried out in single-chip mode in which case noise to be generated by an operation to access an external device connected to the CPU or an external memory via an external bus is minimized. When the microprocessor 300 is operating in this single-chip mode, the ROM 201 and RAM 202 as external memories are inactive. Further, no signals are flowing through an external address bus 203 and a data bus 204. The level of noise to be generated is reduced by setting those external memories and external buses inactive and optimizing the time for which the microprocessor 300 operates in single-chip mode.

To reduce the level of noise generated by the microprocessor 300 while the radio portable terminal is receiving radio data, the programs that are stored in the dual-mode microprocessor 300 should be categorized. More specifically, individual modules (routines) included in the programs are associated with the respective functions of the radio portable terminal by systematically analyzing the codes of each program. Based on those functions, the modules can be separated into two main categories.

The modules of the first category are associated with the functions that are susceptible to the influence of noise, e.g., the radio receiving function. The modules of the first category are executed inside the microprocessor 300 when it is operating in single-chip mode.

The modules of the second category are associated with the functions that are insusceptible to the influence of noise, such as the radio transmitting function, the function for changing the operation mode of the radio portable terminal, and the function to communicated with a user. The modules of the second category operate in extension mode using the ROM 201 and RAM 202 as external memories, the external address bus 203, and the data bus 204.

It is ideal to store all the modules of the first category in the internal ROM (EPROM) 302, more desirably, into the internal EEPROM 303 of the microprocessor 300. The EEPROM 303 may further retain data which varies only occasionally. To effectively use an additional memory which is provided by the internal RAM 301, the modules of the first category are further separated into a main algorithm and sub algorithms.

The main algorithm of the first category consists of an active program which runs continuously. The sub algorithms are programs which are called as needed and frequently use the external address bus, and each sub algorithm is formed by, for example, a delay loop or a loop which monitors a change in the status of the input or the like. The software is designed in such a way that the main algorithm of the first category is permanently saved in the internal ROM 302 (EPROM) of the microprocessor 300 and the sub algorithms of the first category are stored first in the external memories 201 and 202. Each sub algorithm is transferred to the internal RAM 301 every time it is called or only when its specific module is needed. Once the module of any sub algorithm is loaded into the internal RAM 301, this sub algorithm is executed when the microprocessor 300 returns to the single-chip mode or the internal mode.

Unexamined Japanese Patent Publication (KOKAI) No. Hei 7-203510 (hereinafter called "second prior art") discloses a method of reducing the frequency of the system reference clock when a radio portable terminal is used.

Another Unexamined Japanese Patent Publication (KOKAI) No. Hei 8-70258 (hereinafter called "third prior art") discloses a method of changing the frequency of the reference clock in such a manner as to avoid interference between the frequency that is used in the transmission and reception operations of a radio portable terminal and the harmonics of the reference clock.

The aforementioned first prior art has the following problems.

The first problem is the necessity of an exclusive CPU. That is, because a RAM and ROM should be incorporated in a CPU in the first prior art, a conventional ordinary CPU cannot achieve the object.

The second problem lies in that the RAM should be of an exclusive type for the following reason. As a cache in a general-purpose CPU is capable of automatically caching a saved command or data, such a command or data in the incorporated cache is freely rewritten when an external memory is accessed. This leads to the necessity of an exclusive RAM which prevents automatic rewriting of the contents of the cache.

Another solution is to store a program (commands) or data in a non-cache area so that the program (commands) or data will not be cached. But, this scheme prevents the internal RAM from functioning as a cache in normal operation mode, the system's processing speed in normal operation mode is slowed.

The third problem is that the CPU to be used itself becomes expensive because the CPU should be a special chip, not a general-purpose one, in order to avoid the first and second problems.

The second prior art suffers the following problems.

First, the performance gets lower as the reception speed becomes lower. That is, the second prior art is directed to a reception-only terminal and the operation clock is always reduced when the terminal is connected to a communication circuit to receive radio data. More specifically, if this prior art is adapted to a terminal having both transmission and reception capabilities, the operation clock is decreased both in transmission mode and reception mode, the performance is significantly lowered.

Secondly, operation clocks are needed for two systems for the following reason. Most of general-purpose CPUs do not have two clock inputs, and the clocks of general-purpose CPUs which have two clock inputs are a normal operation clock and a clock for measuring the time. The frequency of the time measuring clock is about 32 KHz, which is very slow as the reference clock for radio reception. The use of this clock leads to a considerable reduction in reception speed and is not therefore practical. In this case, an exclusive CPU equipped with another clock input becomes necessary.

Thirdly, when the frequency of the reference clock is reduced or the reference clock is disabled at the time of radio reception, it takes time to return to the normal processing, resulting in a significant reduction in performance. Further, reducing the frequency of the reference clock requires that the OS (Operation System) should handle control of the operation of the radio unit.

Furthermore, this terminal may fail to properly receive reception data for the following reason. It takes time to adjust the timer or clock or time to stabilize the PLL (Phase Locked Loop) or crystal oscillator after the reduction of the clock frequency or the disabling of the reference clock, so that the reception operation cannot be initiated during such a time. This leads to a significant reduction in performance. If the timer or the like in the OS gets wrong, the radio unit does not operate properly and some adjustment should be performed to set the radio unit in the proper operation. Such processing needs a considerable time to restore the normal reception operation, so that processing of received data may not be completed in time to catch the next data.

The third prior art have the following problems.

First, this prior art copes only with the noise that is generated by the reference clock used in a radio section. That is, while generation of noise by the CPU's access to the external bus is dominant in an actual radio portable terminal, the third prior art is directed to a measure against noise generated in the radio section and this method cannot cope with a radio portable terminal which has the radio section integrated with the CPU that performs transmission and reception of information.

Secondly, the noise that is generated by the CPU's access to the external bus has a wide frequency band. The frequency band of the noise generated by the CPU's access to the external bus has a width of several MHz, so that alight alteration of the reference clock cannot eliminate the influence of noise on the frequency band used in radio communication.

Thirdly, some radio portable terminals do not make access synchronous with the reference clock. The timing for memory access is determined by the time, not based on the reference clock. When the operation reference clock is changed, therefore, the timing for memory access is changed and the proper memory access may not be carried out. It is not therefore possible to significantly alter the operation clock of the system.

SUMMARY OF THE INVENTION

Accordingly, it is a primary object of the present invention to provide a noise reducing method for a radio portable terminal, which stores an internal operation program that does not access an external memory in a cache incorporated in a CPU in synchronism with data received by radio, and allows the radio portable terminal to be operated only with access to the internal cache at the time of radio reception, thereby reducing access to the external memory, so that noise to received data can be reduced.

It is another object of this invention to provide a noise reducing method for a radio portable terminal, which can reduce noise by masking interruption to a CPU before a predetermined program is stored in an internal cache in the CPU, thereby suppressing rewriting of a program stored in the cache and preventing access to an external memory of the CPU.

To achieve the above objects, this invention employs the following technical structures.

According to one aspect of this invention, there is provided a noise reducing method for a radio portable terminal having a radio section for transmitting and receiving radio data, a CPU (Central Processing Unit), connected to the radio section and incorporating a cache, for performing predetermined data processing, and an external memory connected to the CPU, which method comprises the steps of reading an internal operation program runnable only in the CPU from the external memory and storing the internal operation program in the cache prior to reception of the radio data; and then executing only the internal operation program and suppressing access to the external memory during reception of the radio data, thereby reducing noise.

According to another aspect of this invention, there is provided a noise reducing method for a radio portable terminal having a radio section for transmitting and receiving radio data, a CPU, connected to the radio section, for performing data processing, and an external memory connected to the CPU, which method comprises the steps of giving a priority order to individual processes to be executed by the radio portable terminal; and masking an interruption process of low priority so as not to execute the masked interruption process at a time of receiving the radio data, thereby reducing noise at a time of receiving the radio data. dr

DETAILED DESCRIPTION OF THE PREFERRED EMBODIMENTS

Preferred embodiments of the present invention will now be described with reference to the accompanying drawings.

Figure 1:
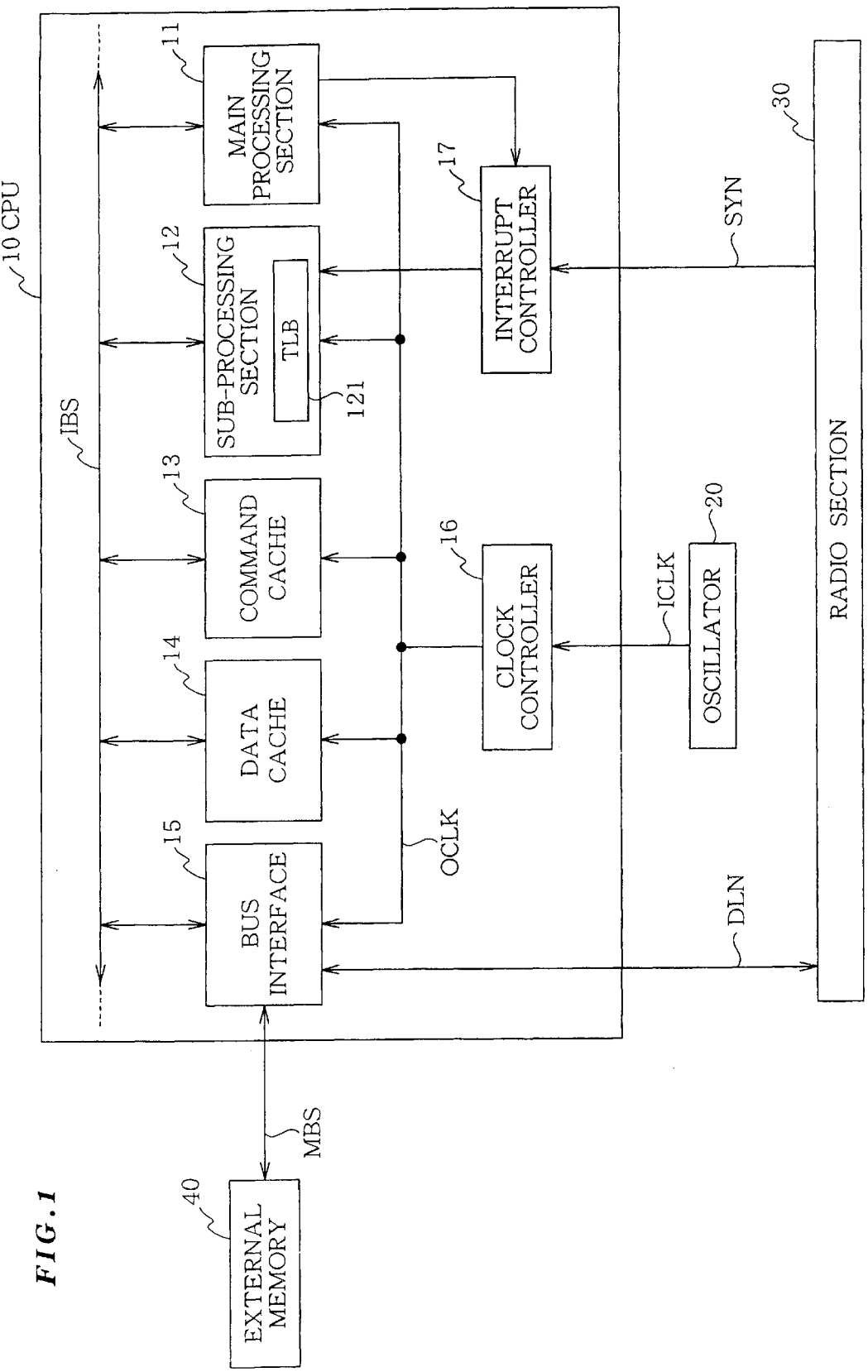
FIG. 1 is a diagram showing the structure of a radio portable terminal according to one embodiment of this invention.

FIG. 1 shows the system structure of a radio portable terminal according to one embodiment of this invention. This radio portable terminal comprises a CPU 10, an oscillator 20, a radio section 30 and an external memory 40. The CPU 10 operates with an input clock ICLK from the oscillator 20 as a reference clock. The radio section 30 sends a reception sync signal SYN synchronous with reception of radio data to the CPU 10, and is connected to the CPU 10 via a data signal line DLN. The external memory 40 performs its data input/output operation under the control of the CPU 10 via a memory bus MBS.

The structure of the CPU 10 will now be described in detail. The CPU 10 comprises a main processing section 11 which performs data processing and analyzes and executes commands, a sub-processing section 12 which performs memory management and exception handling, a command cache 13 as a memory to store commands or a program, a data cache 14 as a memory to store data, a bus interface 15 which controls access to an external unit like a memory, a clock controller 16 which sends an operation reference clock OCLK to the individual blocks, and an interrupt controller 17 which controls an interruption from outside the CPU 10. The sub-processing section 12 includes an address conversion buffer (TLB) 121.

The main processing section 11, sub-processing section 12, command cache 13, data cache 14 and bus interface 15 are mutually connected by an internal bus IBS and implement a data input/output operation. The interrupt controller 17 masks interruptions from outside the CPU 10 according to preset conditions and gives only the necessary interruption to the sub-processing section 12.

Figure 2:
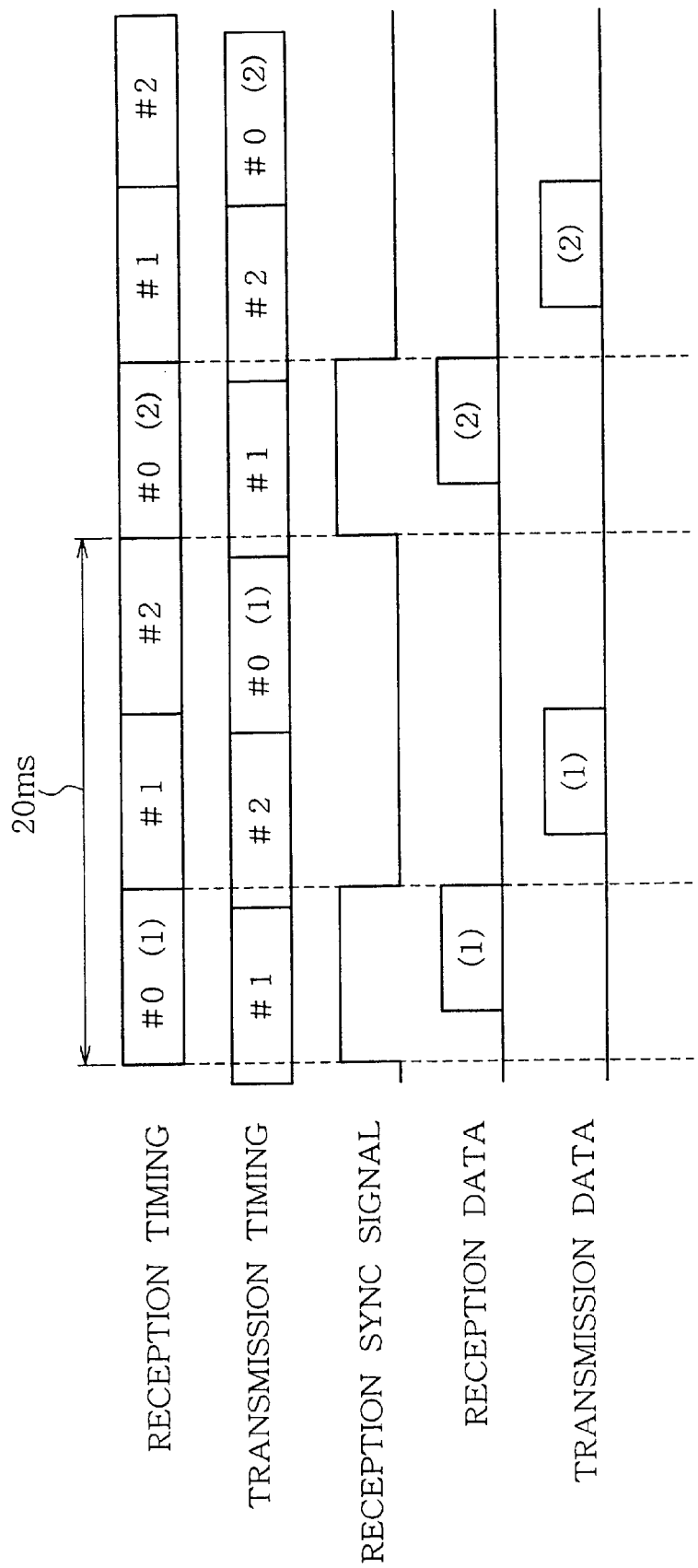
FIG. 2 is a time chart illustrating the transmission and reception timings of a radio section in the radio portable terminal shown in FIG. 1.

FIG. 2 is a time chart illustrating the transmission and reception timings of the radio section in FIG. 1. The time chart in FIG. 2 exemplifies the typical transmission and reception timings in a three-channel-multiplexed TDMA (Time Division Multiple Access) system. FIG. 2 shows the transmission and reception timings of the radio portable terminal (mobile station side). The reception operation is performed first, followed by the transmission operation; reception and transmission are each executed once in every 20 ms and for 20/3 ms. FIG. 2 shows a case where transmission and reception are carried out in slot #0, transmission and reception of data (1) executed first and transmission and reception of data (2) executed next. The reception sync signal SYN is generated every 20 ms in synchronism with the reception timing.

Figure 3:
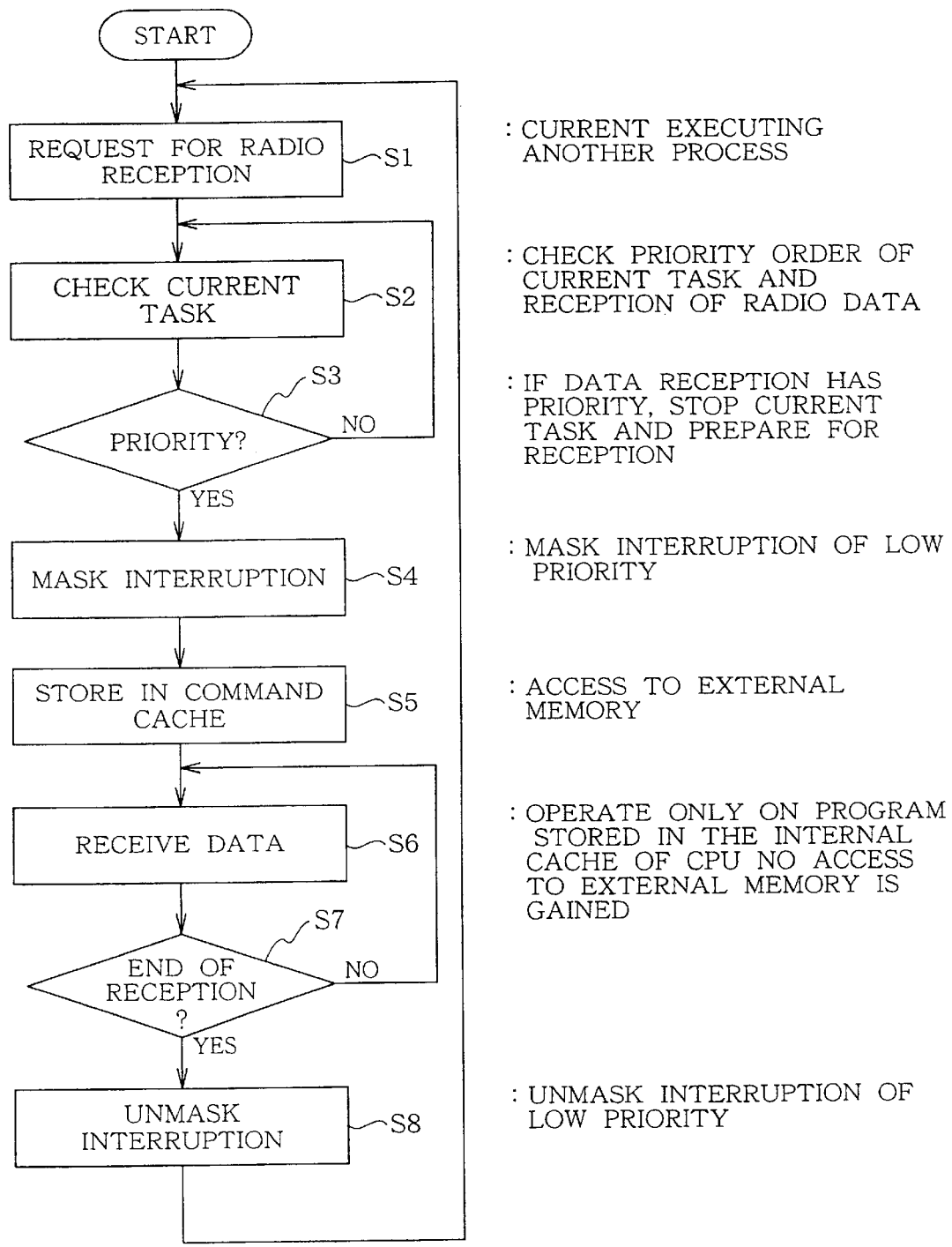
FIG. 3 is a flowchart illustrating a sequence of processes of the radio portable terminal shown in FIG. 1 from the generation of a request for reception of radio data to the end of data reception.

The operation of the radio portable terminal in FIG. 1 will be explained below with reference to an operational flowchart in FIG. 3. FIG. 3 illustrates a sequence of processes from the generation of a request for reception of radio data to the end of data reception.

Suppose that a request for reception of radio data has been made while the radio portable terminal is performing some process (step S1). First, the main processing section 11 checks the contents of the current task (step S2). Then, the main processing section 11 checks if reception of radio data has priority over the contents of the current task (step S3). To accomplish this check, a priority order should previously be set to the individual processes.

When the current task has priority over reception of radio data (N in step S3), the main processing section 11 resumes the current task and does not perform reception of radio data. When the process that has priority over reception of radio data is completed (Y in step S3), the main processing section 11 instructs the interrupt controller 17 to mask an interruption having a lower priority than reception of radio data (step S4). This prevents exception handling from occurring by an interruption having a lower priority than reception of radio data, which would otherwise rewrite the program stored in the command cache 13.

Next, the sub-processing section 12 of the CPU 10 accesses the external memory 40 via the bus interface 15, and stores an internal operation program (module) which does not access the external memory in the command cache 13 (step S5). After storage of the internal operation program, the main processing section 11 of the CPU 10 carries out a process of receiving radio data (step S6). The CPU 10 has nothing to do with the actual reception of the radio data itself which is executed by the radio section 30, but performs data processing after data reception. When reception of the radio data is completed (Y in step S7), the main processing section 11 unmasks the interruption that has a lower priority than reception of radio data (step S8) and returns to the normal operation after which the CPU 10 processes the received data.

At the time of data reception, the CPU 10 operates according only to an internal operation program stored in the internal command cache 13 and does not access the external memory. The CPU 10 can therefore execute another process within the capability of a program which is storable in size in the internal command cache 13.

Since the CPU 10 used in the radio portable terminal generally gives a higher priority to conditions, such as lower power consumption, lower noise and lower price, over the performance, its internal cache merely has a small size of about several kilobytes. Therefore, the aforementioned internal operation program that does not access the external memory should have a size storable in the small-capacity cache. Therefore, a program to be stored in the command cache 13 as an internal operation program which does not access the external memory can be made small if it is designed to keep a loop in a no operation (hereinafter referred to as "NOP") state and leave the loop upon interruption.

The following will discuss another example of the operation of the radio portable terminal.

As mentioned above, in general, the command cache 13 of the CPU 10 used in the radio portable terminal only has a small size of about several kilobytes. This requires that an internal operation program which does not access the external memory should have a size storable in the small-capacity internal cache. The above operational example is premised on a case of an internal operation program with a minimum size, and if the size of the internal command cache 13 is large, it is possible to run a program which executes other processes within its capability that is limited by the size of the command cache 13. In this case, other processes can be executed at the time radio data is received, so that the system performance is enhanced significantly.

Figure 4:
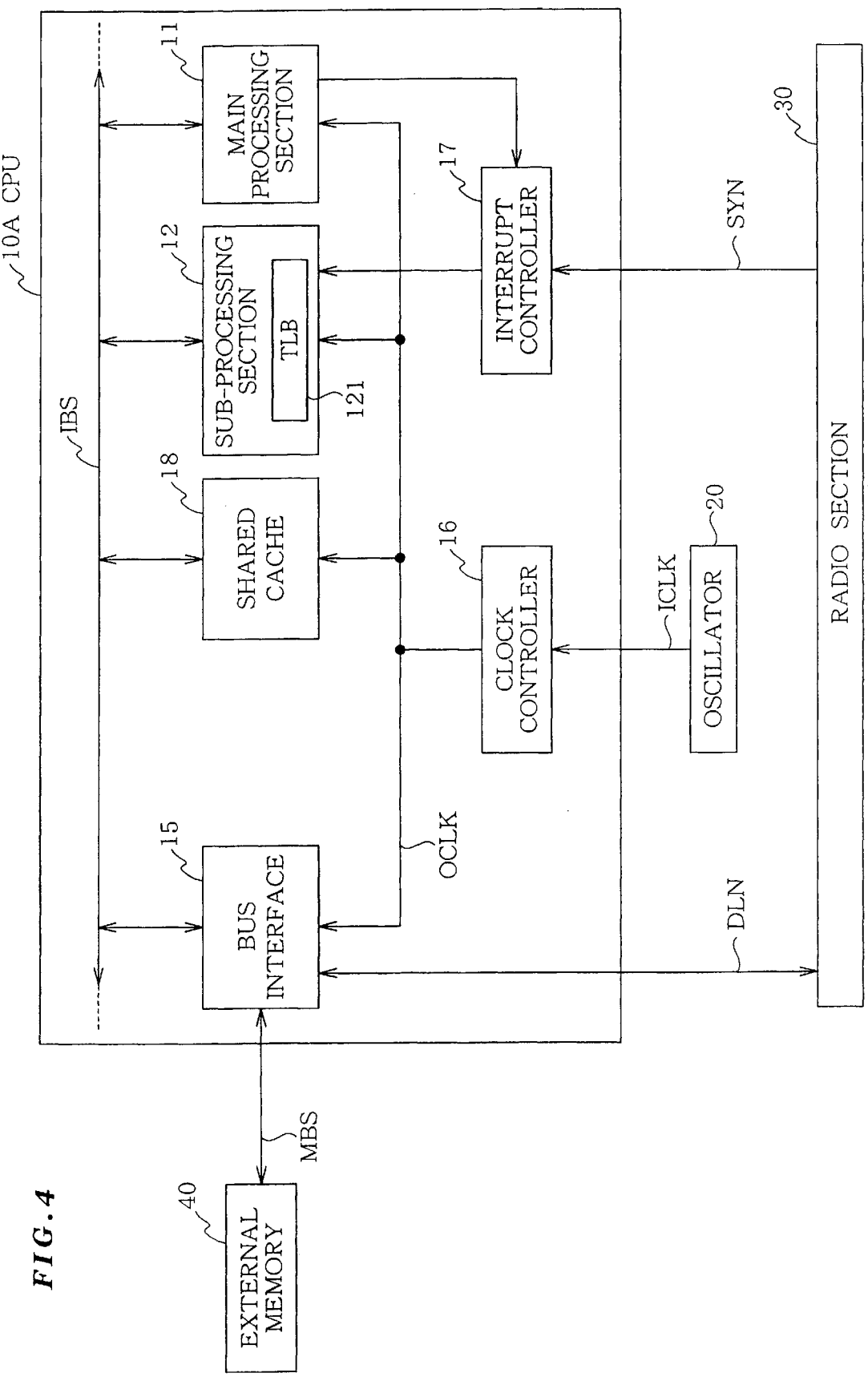
FIG. 4 is a diagram showing the structure of a radio portable terminal according to another embodiment of this invention.

A radio portable terminal according to another embodiment of this invention will now be described specifically by referring to FIG. 4. The radio portable terminal shown in FIG. 4 has a structure such that the command cache 13 and the data cache 14 of the radio portable terminal shown in FIG. 1 are shared with each other. That is, the command cache 13 and the data cache 14 are designed as a single shared cache 18, which is equipped in a CPU 10A. In this case, it is effective to provide a cache lock mechanism which uses, in a fixed manner, an area in the cache where a program is stored in order to prevent an internal operation program previously stored in the cache from being replaced with another program. The cache lock mechanism will be discussed below.

Figure 5:
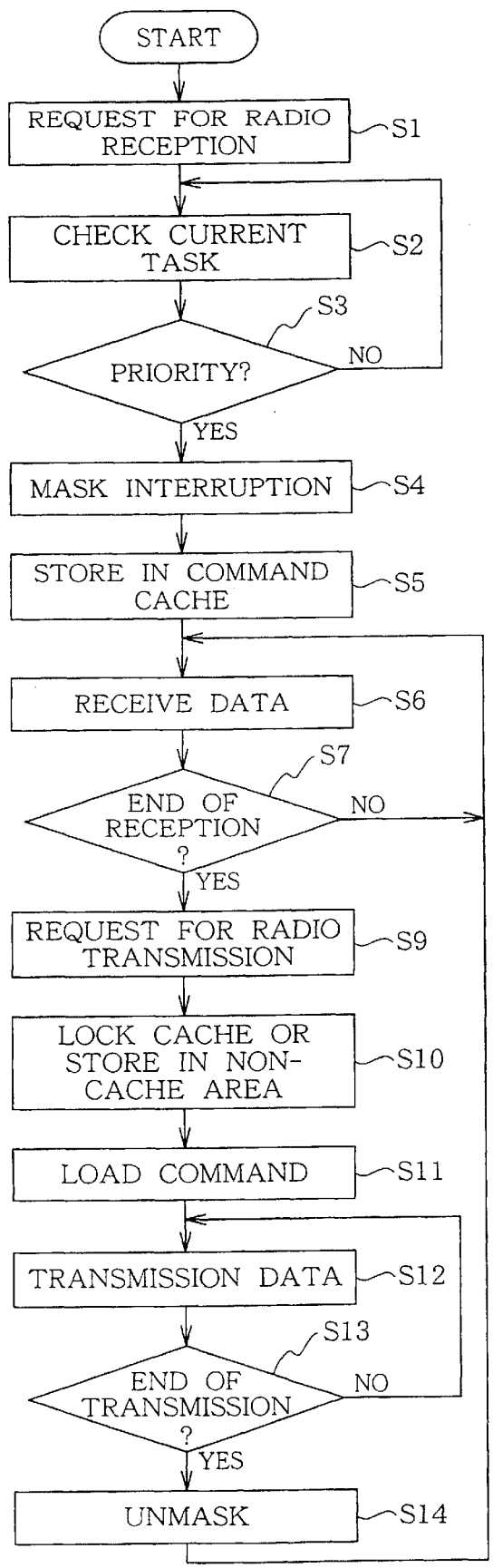
FIG. 5 is a flowchart illustrating a sequence of processes of the radio portable terminal embodying this invention in a case where transmission and reception are alternately performed.

FIG. 5 presents a flowchart of a sequence of processes in a case where transmission and reception are alternately performed. The system structure is the same as those of FIGS. 1 and 4. The following will discuss an example where the system structure shown in FIG. 1 is employed.

The flowchart of an operation of receiving radio data is nearly the same as the one shown in FIG. 3, and radio data is transmitted without unmasking an interruption. That is, steps S1 to S7 in FIG. 5 are almost the same as those in FIG. 3, and step S8 in FIG. 3 is skipped to enter a process of transmitting radio data which will be discussed below.

When a transmission request for radio data is input (step S9), a transmission-mode operation program which is used at the time of transmitting radio data is loaded (step S11). At this time, a process of preventing rewriting of the internal operation program at the time of receiving radio data, which has previously been stored in the cache, is executed in step S10 between step S9 and step S11. There are two ways (means) to accomplish the prevention.

The first means uses the cache lock mechanism which fixes an area where an internal operation program (module) which runs at the time of receiving radio data is stored to thereby prevent rewriting of that program. In this case, what is in other areas in the cache can be rewritten freely. The second means stores a transmission-mode operation program, which is used at the time of receiving radio data, in a non-cache area. As a transmission-mode operation program, which is used at the time of receiving radio data, is stored in the non-cache area in the external memory 40, this program will not be cached so that the internal operation program at the time of receiving radio data will not be rewritten with the loaded data. By preventing rewriting of an internal operation program at the time of receiving radio data which has been stored in advance in the above manner, the receivable state can always be maintained even in a radio system which implements transmission and reception of radio data in a short period of time.

Then, data transmission is carried out (step S12). As transmission data is not affected much by noise generated from the CPU or other noise at the time of transmitting radio data, the operations of the other blocks need not be stopped. To prevent exception handling from rewriting an internal operation program at the time of receiving radio data which has been stored in the cache, however, an interruption should be used as masked. In this case, simultaneous execution of another process requires such restriction that the program should run only at the time of transmitting radio data. When transmission of radio data is completed (Y in step S13), the main processing section 11 unmasks the interruption (step S14) and returns to step S6.

Through the above processes, transmission and reception of radio data are executed alternately.

Figure 6:
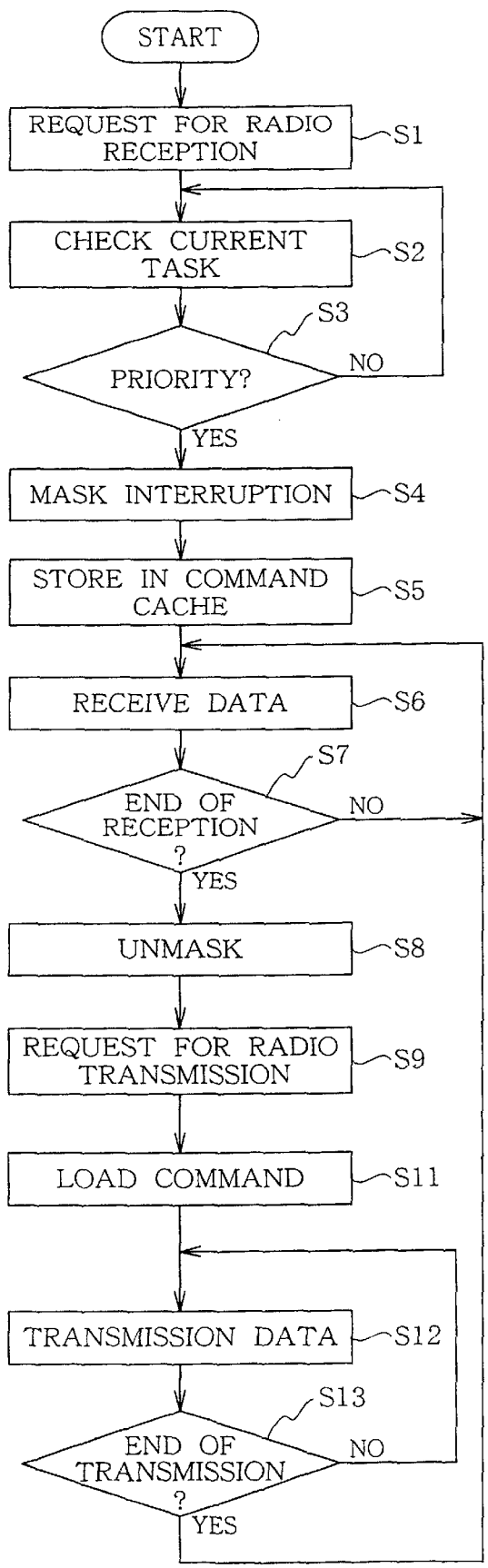
FIG. 6 is a flowchart illustrating a sequence of processes of the radio portable terminal embodying this invention in a case of a radio system which has a sufficiently long interval for switching transmission and reception from one to the other.
Figure 7:
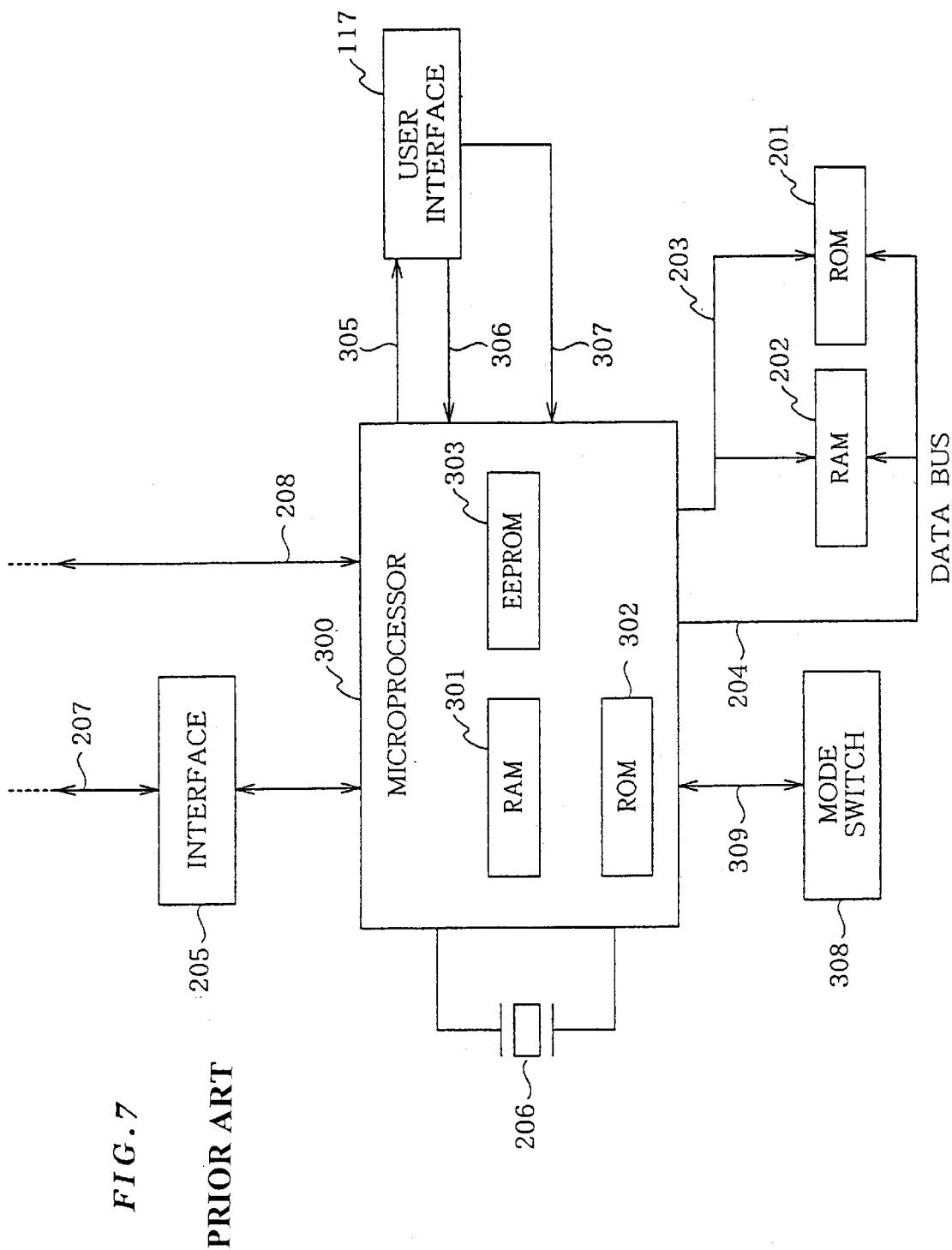
FIG. 7 is a block diagram showing the structure of the conventional radio portable terminal.

Referring to FIG. 6, a description will now be given of a sequence of processes in a case where transmission and reception of radio data are executed alternately by a radio system which has a sufficiently long interval for switching between transmission and reception. The system structure is the same as those of FIGS. 1 and 4. The flowchart for reception of radio data is almost identical to the one shown in FIG. 5, except that radio data is transmitted after unmasking an interruption (step S8). That is, steps S10 and S14 in FIG. 5 are omitted and step S8 is added between step S7 and step S9.

As transmission data is not affected much by noise at the time radio data is transmitted, the normal operation shall take place. Since the interval switching between transmission and reception is sufficiently long, even if an internal operation program at the time of receiving radio data which has been stored in the cache in advance is rewritten, it is still possible to store an internal operation program in the cache again at the time of data reception. It is to be noted however that, as mentioned above, simultaneous execution of another process at the time of data transmission requires such restriction that the program should run only at the time of transmitting radio data. Through the above processes, transmission and reception of radio data are executed alternately.

As apparent from the above, the summary of this invention will be given below with reference to FIG. 1.

When the reception sync signal SYN is input to the CPU 10 from the radio section 30, the sub-processing section 12 loads an internal operation program which access no external memory from the external memory 40 into the command cache 13. At this time, the interrupt controller 17 is instructed to mask an interruption of a low priority in order to prevent data stored in the command cache 13 from being rewritten by exception handling which is originated from another interruption. This eliminates the need to acquire a command and data for executing the internal operation program from the external memory 40 during radio reception. This decreases the number of accesses to the external memory 40 by the CPU 10, thereby ensuring reduction in noise which affects the radio section 30 can be decreased. It is also possible to execute a process other than reception inside the CPU 10 during radio reception.

It should of course be apparent to those skilled in the art that the present invention is not limited to the above-described embodiments but may be modified in various other forms without departing from the spirit or scope of the invention.

As described above, this invention has the following advantages.

The first advantage is that noise which affects the radio section can be reduced without considerably lowering the system performance. This is because an internal operation program which does not access the external memory only in reception mode is executed just in the CPU in synchronism with the radio-received signal. As the program runs in the CPU at the time of reception, therefore, noise can be reduced and the normal operation takes place in transmission mode so that the performance is not reduced much.

The second advantage is that reduction in radio reception sensitivity is prevented by storing an internal operation program in the command cache at the time of radio reception. This is because storing an internal operation program in the command cache at the time of radio reception reduces the number of accesses to the external memory by the CPU, which can reduce noise generated by access to the external memory.

The third advantage is that reduction in radio reception sensitivity is prevented by masking an interruption of a low priority for the following reason. The masking process can prevent exception handling from being executed by generation of an interruption, which would otherwise rewrite the program previously stored in the command cache. If exception handing occurs, the above process switches the command cache so that at the time of performing a process of receiving radio data again, a program should be read by re-accessing to the external memory. As reception of radio data is carried out with priority, the other blocks will not function, thus reducing noise.

The fourth advantage is a capability of preventing insufficiency of the performance or significant reduction of the system performance after reception of radio data for the following reason. As the reception sensitivity is enhanced by reducing noise without disabling the operation reference clock of the CPU at the time of receiving radio data, it is possible to move to a post-reception process right away. Generally speaking, when the operation reference clock is disabled, it needs time to adjust the timer or clock or time to stabilize the PLL or crystal oscillator to become stable after the reduction of the clock frequency or the disabling of the reference clock, so that the CPU cannot stably perform processing immediately after the operation reference clock is disabled.

The fifth advantage is that the radio portable terminal can be constructed using a general-purpose CPU because the system is operable with a general-purpose CPU with an internal cache and requires no exclusive CPU having a ROM or RAM incorporated therein. Further, the system can be constructed in accordance with an arbitrary cache size by allowing a program whose size matches with the capacity of the internal cache at the time of receiving radio data. Because there is no built-in exclusive ROM, it is possible to easily correct or change a program.

The sixth advantage is that even a small portable terminal can be permitted to receive radio data for the following reason. Because noise at the time of reception is reduced, even a small portable terminal having its radio section arranged close to the CPU can receive radio data without reducing the reception sensitivity of the radio section.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-305837 (Filed on Oct. $27^{th}$, 1998) including specification, claims, drawings and summary are incorporated herein by reference in its entirety.

What is claimed is:

1. A noise reducing method for a radio portable terminal having a radio section for transmitting and receiving radio data, a CPU connected to said radio section for performing data processing, and an external memory connected to said CPU, said method comprising the steps of:

giving a priority order to individual processes to be executed by said radio portable terminal;

distinguishing a period of time of reception of said radio data from non-reception periods detecting a sync signal associated with said radio data sent from said radio section during reception of said radio data; and masking, in response to said sync signal, an interruption process having a lower priority than a priority of receiving said radio data so as not to execute said masked interruption process at a time of receiving said radio data, thereby reducing noise at the time of receiving said radio data.

2. The noise reducing method according to claim 1, wherein when transmission/reception of said radio data is repeatedly carried out, a transmission-mode operation program runnable at a time of transmitting said radio data is stored in said external memory; and a cache in said CPU is locked at a time said transmission-mode operation program is executed.

3. The noise reducing method according to claim 1, wherein when transmission/reception of said radio data is repeatedly carried out, a transmission-mode operation program runnable at a time of transmitting said radio data is stored in a predetermined non-cache area provided in said external memory.

4. The noise reducing method according to claim 1, wherein at a time of transmitting said radio data, said interruption process is unmasked to thereby provide a normal operation.

* * * * *